(12) United States Patent
Hattermann

(10) Patent No.: US 12,730,056 B2
(45) Date of Patent: Sep. 8, 2026

(54) SENSOR ARRANGEMENT FOR DETECTING PARTICLE FEATURES

(71) Applicant: Q.ant GmbH, Stuttgart (DE)

(72) Inventor: Helge Hattermann, Pliezhausen (DE)

(73) Assignee: Q.ANT GMBH, Stuttgart (DE)

( * ) Notice: Subject to any disclaimer, the term of this patent is extended or adjusted under 35 U.S.C. 154(b) by 251 days.

(21) Appl. No.: 18/454,520

(22) Filed: Aug. 23, 2023

(65) Prior Publication Data

US 2024/0068927 A1 Feb. 29, 2024

(30) Foreign Application Priority Data

Aug. 25, 2022 (DE) ..................... 10 2022 121 532.6

(51) Int. Cl.
*G01N 15/1434* (2024.01)
*G01N 15/14* (2024.01)

(52) U.S. Cl.
CPC . *G01N 15/1434* (2013.01); *G01N 2015/1493* (2013.01)

(58) Field of Classification Search
CPC ....... G01N 15/1434; G01N 2015/1493; G01N 15/0205; G01N 15/1459
USPC .......................................................... 356/338
See application file for complete search history.

(56) References Cited

U.S. PATENT DOCUMENTS

2009/0051536 A1* 2/2009 Lahiri .................... G06K 17/00 340/572.3
2010/0027007 A1* 2/2010 Adams ................ G01N 15/147 356/338
2013/0335739 A1 12/2013 Stengel et al.
2022/0113240 A1 4/2022 Foertsch et al.

FOREIGN PATENT DOCUMENTS

DE 102011002421 A1 7/2012
DE 102008064760 B3 7/2015
EP 2186542 A1 * 5/2010 ........... A61N 5/1048
RU 2680059 C1 * 2/2019 ............... B08B 3/10
WO WO 2020259889 A1 12/2020
WO WO 102019209213 A1 12/2020

* cited by examiner

*Primary Examiner* — Md M Rahman
(74) *Attorney, Agent, or Firm* — LEYDIG, VOIT & MAYER, LTD.

(57) ABSTRACT

A sensor arrangement for detecting features of particles includes an emitter for emitting electromagnetic radiation, a detector for receiving the radiation emitted from the emitter and for providing detector signals as a function of the received radiation, a measurement chamber configured to be irradiated by the radiation emitted by the emitter and to receive particles flowing therethrough, an evaluation unit for evaluating the detector signals, and a locating unit for locating the measurement chamber with respect to a reference point of a coordinate system, so that a respective position of a respective particle within the radiation is determinable.

11 Claims, 6 Drawing Sheets

10
14
16
34
12
26
36
28
30
20
24
38
40
32
22

SENSOR ARRANGEMENT FOR DETECTING PARTICLE FEATURES

CROSS-REFERENCE TO PRIOR APPLICATION

This application claims benefit to German Patent Application No. DE 10 2022 121 532.6, filed on Aug. 25, 2022, which is hereby incorporated by reference herein.

FIELD

Embodiments of the present invention relate to a sensor arrangement for detecting features of particles, and to a method for determining features of particles using a sensor arrangement for detecting particle features.

BACKGROUND

DE 10 2019 209 213 A1 discloses a sensor arrangement for determining particle positions and particle sizes, in which the intensity and polarization of a laser beam is spatially varied by a mode conversion unit.

However, the expenditure for determining the shape of the particles is high in the devices known from the prior art.

Furthermore, it is advantageous for a precise measurement when the particles pass through the focus of the laser beam. The measurable particle cross-section is dependent on the cross-section of the laser beam, at which the particle passes through the laser beam. The focus has a smaller cross-section than the rest of the laser beam and accordingly the measurable particle size at the focus is also smaller than along the remaining laser beam. However, a measurement of the particles outside the focus is linked to measurement inaccuracies.

SUMMARY

Embodiments of the present invention provide a sensor arrangement for detecting features of particles. The sensor arrangement includes an emitter for emitting electromagnetic radiation, a detector for receiving the radiation emitted from the emitter and for providing detector signals as a function of the received radiation, a measurement chamber configured to be irradiated by the radiation emitted by the emitter and to receive particles flowing therethrough, an evaluation unit for evaluating the detector signals, and a locating unit for locating the measurement chamber with respect to a reference point of a coordinate system, so that a respective position of a respective particle within the radiation is determinable.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
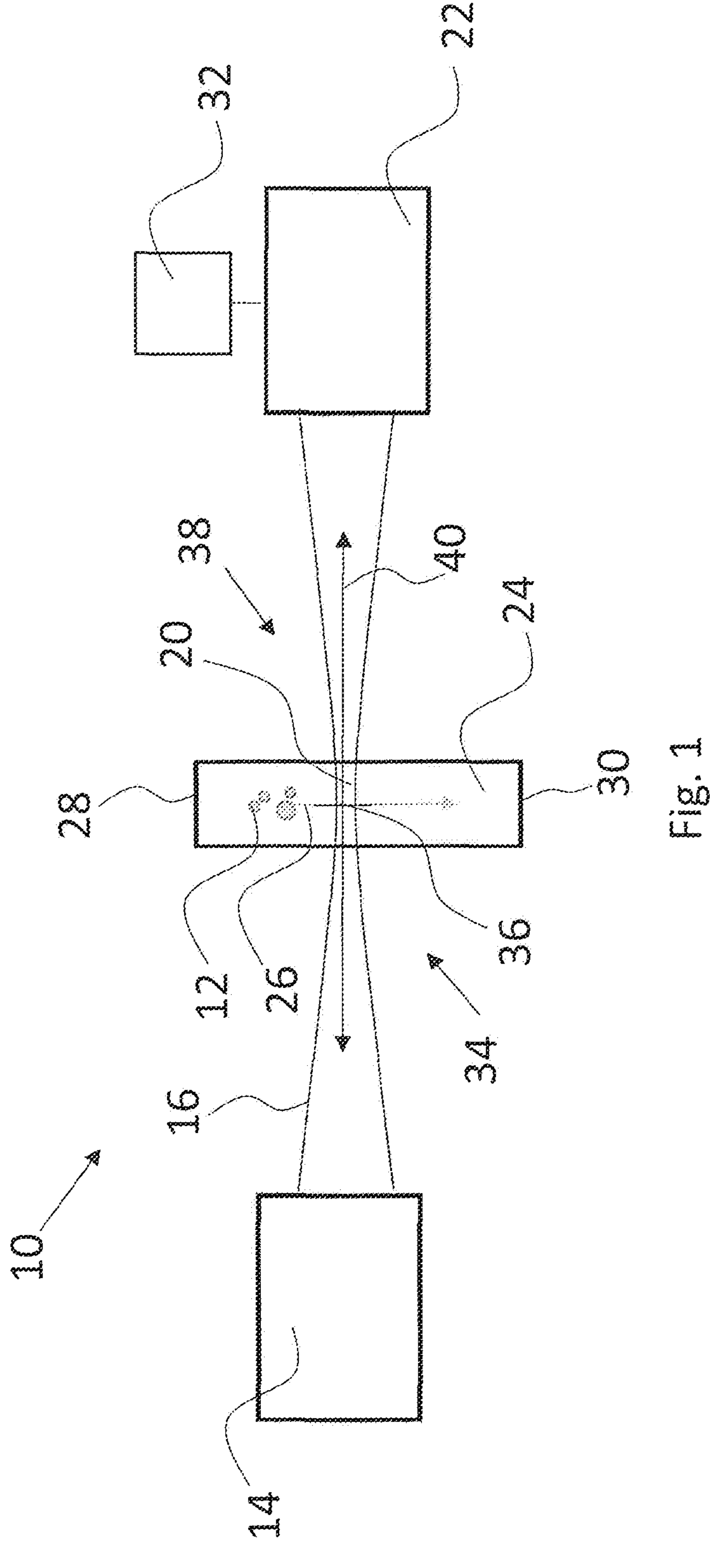
FIG. 1 shows a sensor arrangement for detecting particle features having a measurement chamber according to some embodiments.

Embodiments of the present invention provide a device, using which features of particles, in particular their size, can be determined more easily and accurately. Embodiments of the invention also provide a method for determining the features of particles using such a device.

According to embodiments of the present invention, a sensor arrangement for detecting features of particles is provided, which is equipped with an emitter for emitting electromagnetic radiation, a detector for receiving radiation emitted from the emitter and for providing detector signals as a function of the received radiation, a measurement chamber, which can be irradiated by the emitter by way of the radiation, for receiving particles flowing through, an evaluation unit for evaluating the detector signals, a locating unit for locating the measurement chamber with respect to a reference point of a coordinate system, so that the position of a particle within the emitted radiation is determinable.

The radiation diameter is known for each position along the radiation. Due to the locating of the particle within the radiation, it becomes possible to assign a radiation diameter to a measured particle feature, at the position of which the particle passes through the radiation. In particular, by means of an algorithm for calculating, for example, the particle size, the measurement range between the maximum and the minimum particle size can thus be set as a function of the position in the coordinate system or the radiation. In this case, the radiation diameters and the radiation cross-sections derivable therefrom are known for each position within the radiation field of the radiation.

The measurement chamber can be a partially closed cuvette transparent to the radiation, which can receive particles. The received particles can be irradiated inside the measurement chamber.

The evaluation unit contains a controller and a memory. The controller can include a microcontroller and can be used for digitizing the detector signals, so that they can be evaluated. The evaluation unit can be a computer, such as a PC, smartphone, microcontroller, or the like. Furthermore, the evaluation unit can also be a network made up of computing units, such as a cloud-based service.

The detector signals essentially arise due to shading of the detector by the particles in the radiation (extinction method) or by scattering of the radiation by the particles. The shading is greater the larger the particle cross-section is with respect to the propagation direction of the radiation in the direction of the detector.

In one particular refinement, it can be provided that the measurement chamber is a preferably oblong hollow body transparent to the radiation, which includes an inlet and an outlet for particles, so that at least one particle can flow through the measurement chamber. In this way, particles which have a high velocity can flow through the measurement chamber. Such a measurement chamber can be integrated directly into a production facility in which particles are to be measured with respect to their particle size. Such a production facility can be, for example, an industrial coffee grinding machine. The measurement chamber is designed, for example, as a tube. The tube can be made of glass or acrylic. The tube can have a round or a rectangular cross-section. The radiation can be incident perpendicularly on a section of the wall of the tube here. Alternatively, cubic measurement chambers can also be used.

The radiation is advantageously a laser radiation and the reference point can be arranged at the location of the focus of the laser radiation. The laser radiation can have a Gaussian and/or doughnut-shaped and/or a top hat-shaped laser intensity profile here. The doughnut-shaped laser intensity profile essentially corresponds to a torus, which is aligned coaxially to the propagation direction of the laser beam. The focus of the laser beam can be set precisely, so that the reference point can be accurately determined.

The locating unit preferably includes a positioning section, in which the measurement chamber is displaceable along a positioning axis in the coordinate system. The positioning section is a section area in the coordinate system in which the measurement chamber is displaceable. The positioning axis is preferably a linear axis which is aligned essentially parallel or collinear to the laser propagation direction. If the measurement chamber is displaced along the positioning axis, its position or the position of the particle, for example, with respect to the focus can be determined by means of the locating unit. In this case, the measurement chamber preferably includes a cavity, which has an extension in the beam direction. The particle can assume various positions delimited by the cavity inside the cavity. Since the position of the measurement chamber is now essentially determined by the locating unit, the absolute position of the particle can vary by the dimension of the cavity along the positioning axis.

It is preferred that the measurement chamber has a lesser extension along the positioning axis than the positioning section. It is thus possible to displace the measurement chamber along the positioning axis, since there is a free space between the boundaries of the positioning section and the wall of the measurement chamber, which enables a displacement of the measurement chamber.

A simple sensor arrangement can be achieved if the positioning section has different discrete positioning spaces, in which the measurement chamber can be arranged inside the positioning section. In this case, the measurement chamber can be fastened at a positioning space, for example, by latching or screwing tight. The position with respect to the reference point is known in each positioning space and stored in a memory of the evaluation unit or a different controller.

Alternatively, the measurement chamber can be installed in a chamber carrier which is arranged on a positioning space, wherein the positioning area only includes one positioning space. The measurement chamber is arranged here in a defined position on the chamber carrier. In order to change the position with respect to the reference point of the measurement chamber, multiple chamber carriers are provided, which each differ with respect to the position of the measurement chamber on the respective chamber carrier.

In one particular refinement, it can be provided that an adjustment unit is part of the sensor arrangement, so that the measurement chamber is positionable continuously along the positioning section. A position within the coordinate system can be precisely assumed in this case. Furthermore, a combination of positioning spaces and an adjustment unit can also be provided, so that a continuous adjustment of the measurement chamber can take place starting from a positioning space.

The adjustment unit can preferably be a set screw, which includes an encoder unit, wherein the set screw displaces the measurement chamber along the positioning axis and the position of the measurement chamber is converted by the encoder unit into a digital signal. The encoder unit can be connected to the evaluation unit. The set screw can be driven by an electric motor or by hand. The electric motor can contain the encoder unit.

In order that properties of the measurement chamber can be determined by the evaluation unit, in one particular refinement, the measurement chamber includes an identifier, which is readable in particular via an RFID system and/or a laser-scannable code. In this case, the position of the measurement chamber in the coordinate system can be read out and/or the type of the measurement chamber can be identified, for example, wherein the material and the shape of the measurement chamber can determine the type.

The particles preferably flow in a particle flow through the measurement chamber, wherein the flow direction extends transversely to the positioning axis. In particular, the measurement chamber can be a straight tube which is aligned perpendicularly to a laser beam.

The method according to embodiments of the invention for determining features of particles using the sensor arrangement for detecting particles includes the following steps:

- emitting electromagnetic radiation from an emitter;
- at least partially receiving the electromagnetic radiation using a detector;
- conducting particles through a measurement chamber which can be irradiated by the emitter;
- providing detector signals from the intensity of the radiation received by the detector by way of the detector;
- locating the measurement chamber with respect to a reference point of a coordinate system of the sensor arrangement, so that the position of a particle within the emitted radiation is determined;
- determining at least one feature of the particles which flow through the measurement chamber.

With respect to the positioning axis in the coordinate system, a cross-sectional ratio between a radiation cross-section and a particle cross-section aligned with respect to the propagation direction of the radiation is determined, wherein the cross-sectional ratio is determined with respect to a calibration curve related to the positioning axis. The beam cross-section can be, for example, the cross-section of a laser beam. To obtain the cross-sectional ratio, the position of the particle along the positioning axis is determined, since the radiation cross-section is known at each position and is stored in a table in a memory of the evaluation unit. The detector signal induced by the shading of the particle cross-section is dependent on the position of the particle in the radiation field. If, for example, in a laser beam, a particle having the particle cross-section $A_p$ is in the focus of the laser beam at the location having the radiation cross-section $A_f$, a different shading occurs than if a particle having the same particle diameter $A_p$ passes through the laser beam at a location having the beam cross-section $A_x$ outside the focus. In this case, the cross-sectional ratio is $A_f/A_p<A_x/A_p$, because the radiation cross-section $A_x$ is greater than the radiation cross-section $A_p$. This also influences the measurement quality of large particle cross-sections with smaller radiation cross-sections. Large particle cross-sections thus cannot be measured in the focus of the laser beam with the same quality and lower signal-to-noise ratio as/than outside the focus. However, the framework conditions such as light intensity and shape of the laser beam profile are different at the various positions of the laser beam, so that a calibration curve is needed for each position in order that the detector signals can be evaluated by the evaluation unit. The calibration curve can be obtained either by measurements at the factory and/or on location or can be created by artificial intelligence depending on the laser beam quality, degree of soiling of the sensor unit, and/or particle type. In this case, a regular recursion can be used for, for example, assisted machine learning, in which feedback about the quality of the calibration is regularly given by a human to the algorithm of the artificial intelligence. The algorithm can be executed in the evaluation unit.

In particular, calibration curves for each position along the positioning axis are stored in a memory of the sensor arrangement, and at least one calibration curve is read out to determine the cross-sectional ratio with respect to the position assumed in each case by the measurement chamber. Each calibration curve of a single position can be used here, for example, for different framework conditions of the measurement at this position. Instead of calibration curves, correction factors can also be used, which are stored like the calibration curves in a memory and are read out accordingly as needed in order to correct the detector signals. The calibration curves can be replaced by correction factors hereinafter.

In order that the evaluation of the detector signals by the evaluation unit can be carried out using the calibration curves, a diameter ratio between a maximum and a minimum particle diameter of the measurable particle cross-sections remains constant independently of the position of the measurement chamber along the positioning axis. In this case, the correct calibration curve for each position along the positioning axis ensures a measurement range between maximum and a minimum particle diameter which has a sufficient measurement quality so that dependable statements can be made about the particle size. The diameter ratio is preferably approximately 20.

Further advantages of the embodiments of the invention are evident from the description and the schematic drawing. Similarly, the features mentioned above and those yet to be explained further can be used in each case individually or together in any desired combinations. The embodiments shown and described should not be understood as an exhaustive list, but rather are of an exemplary character for outlining the invention. Direction and location specifications such as left, right, above, and below are to be understood according to the reading direction of the drawing.

FIG. 1 shows a sensor arrangement 10, which is provided for detecting features of particles 12. The sensor arrangement 10 includes an emitter 14 for emitting an electromagnetic radiation 16, preferably in the form of a laser beam, which includes a focus 20.

Furthermore, a detector 22 is provided for receiving the radiation 16 from the emitter 14. Upon receiving the radiation 16, the detector 22 generates detector signals which contain information about the particle features such as the particle size in dependence on the received radiation 16.

A measurement chamber 24, which can be irradiated by the emitter 14 by way of the radiation 16, is provided in the sensor arrangement 10 for receiving particles 12 flowing along a flow direction 26 through the measurement chamber 24. The measurement chamber 24 is transparent to the radiation 16 and is formed as a tubular, preferably elongated hollow body. The measurement chamber 24 can be a tube and/or a cuvette. Alternatively, cubic measurement chambers 24 can also be used.

The measurement chamber 24 includes an inlet 28 and an outlet 30 for particles 12, so that at least one particle 12 can enter the preferably straight tube in the flow direction 26 in the inlet 28 and can leave again from the outlet 30.

The wall of the measurement chamber 24, through which the radiation 16 enters the measurement chamber 24 and is incident on the particles 12 to be measured, is made of glass or acrylic, for example. The tube can have a round or a rectangular cross-section. The radiation can be incident here perpendicularly on a section of the wall of the tube transparent to the radiation 16.

The detector signals essentially arise due to shading of the detector 22 by the particles 12 in the radiation 16. The shading is greater the larger the particle cross-section is with respect to the propagation direction of the radiation 16 in the direction of the detector 22. The measurement chamber 24 having the particles 12 is arranged between the emitter 14 and the detector 22, so that the radiation 16 passes through the measurement chamber 24 on the path from the emitter 14. The particles 12 contained in the cavity of the measurement chamber 24 are then irradiated and generate a shadow on the detector 22.

The detector 22 is connected to an evaluation unit 32 for evaluating the detector signals. The evaluation unit 32 evaluates the detector signals with respect to the size of the shadow by means of a controller and a memory. The controller can include a microcontroller and can be used for digitizing the detector signals, so that the detector signals can be evaluated.

Furthermore, the sensor arrangement 10 includes a locating unit 34 for locating the measurement chamber 24 with respect to a reference point 36 of a coordinate system 38. The position of a particle 12 is determinable within the emitted radiation 16 with respect to the reference point 36 by the locating unit 34.

The radiation 16 embodied as laser radiation includes the reference point 36 at the location of the focus 20 of the laser beam. In this case, the laser radiation can have a doughnut-shaped laser intensity profile, which essentially corresponds to a torus aligned coaxially to the propagation direction of the laser beam. The laser beam propagates from the emitter 14 to the detector 22 along a positioning axis 40 in the coordinate system 38.

The radiation diameter or the radiation cross-section $A_x$ of the laser beam is known for each location along the positioning axis 40 in relation to which the laser beam is aligned collinear or parallel.

If a particle 12 passes at a specific location along the positioning axis 40 through the laser beam, a radiation cross-section $A_x$ is then assignable to the location and thus the measurement of the particle features.

Figure 2:
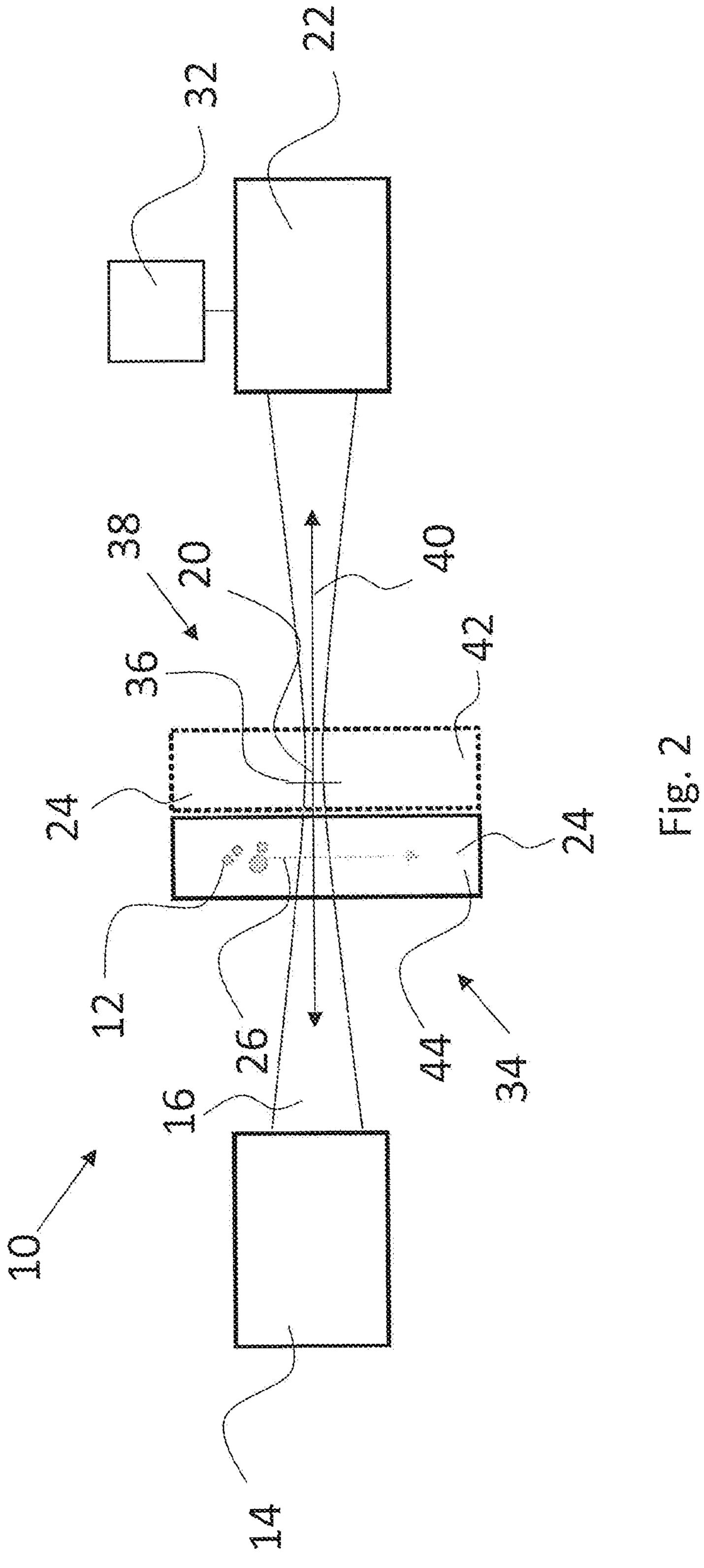
FIG. 2 shows the sensor arrangement with displaced measurement chamber according to some embodiments.

FIG. 2 shows that the measurement chamber 24 can be displaced along the positioning axis 40. The displacement of the measurement chamber 24 takes place here from a first position 42 to a second position 44. The measurement chamber 24 is aligned in relation to the positioning axis 40 so that the flow direction 26 is aligned perpendicularly to the positioning axis 40 at each position along the positioning axis 40. By way of example, in FIG. 2 the first position 42 is in the area of the focus 20 of the laser beam having the radiation cross-section $A_f$ and the second position of the measurement chamber 24 is in the area of a larger radiation cross-section $A_x$ adjacent to the focus 20. The position of the measurement chamber 24 with respect to the reference point 34 can be determined by the locating unit 34.

Figure 3:
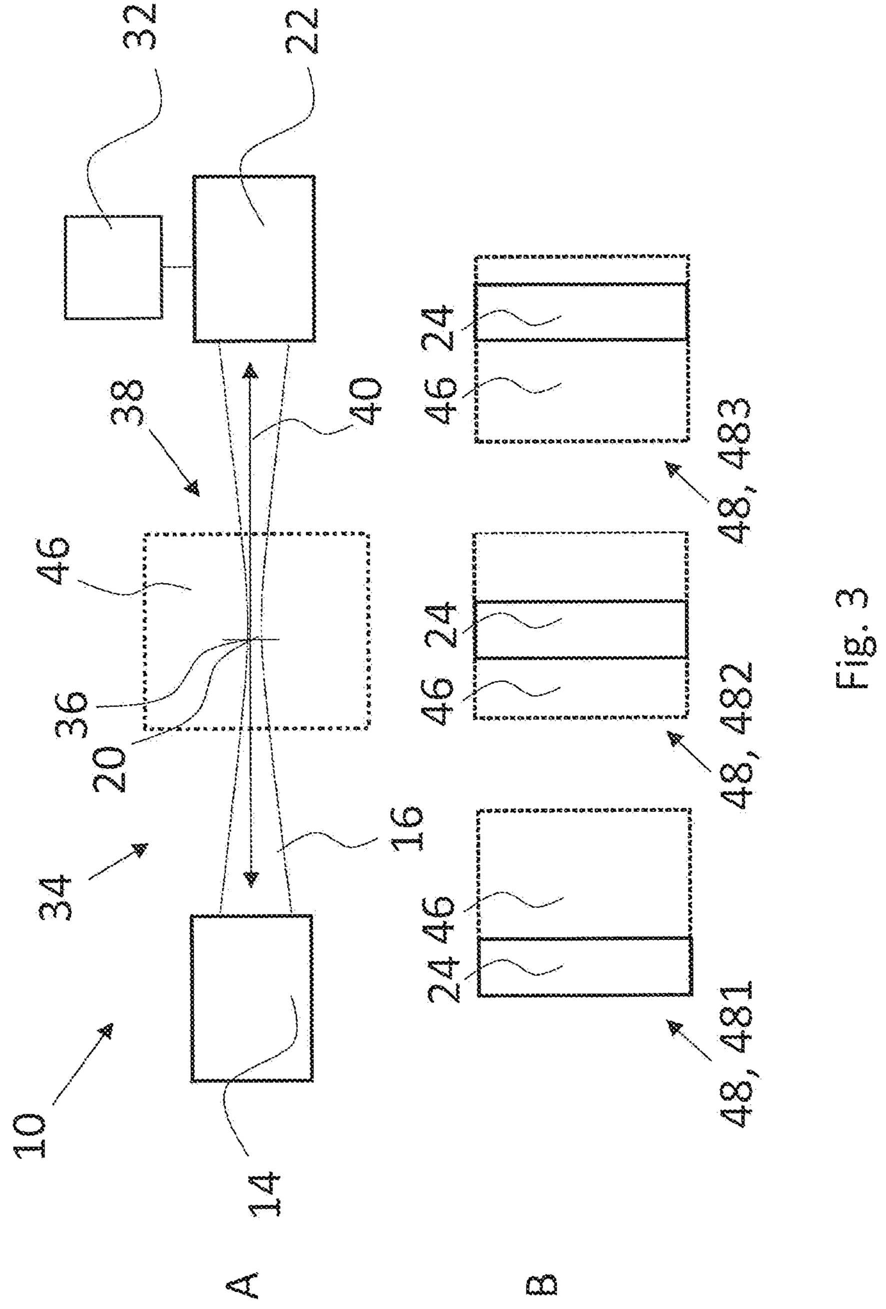
FIG. 3A shows an embodiment of the sensor arrangement.
FIG. 3B shows measurement chambers in three different positioning spaces according to some embodiments.

An exemplary embodiment is shown in FIG. 3A and FIG. 3B, in which the locating unit 34 includes a positioning section 46. The measurement chamber 24 can be displaced along a positioning axis 40 in the coordinate system 38 within the positioning section 46. The positioning section 46 is a free space or section area within the coordinate system 38, in which the measurement chamber 24 can be positioned within the radiation 16. The radiation cross-sections A_x are known at the positions within the positioning section 46. If the measurement chamber 38 is displaced along the positioning axis 40, its position or the position of the particle 12 with respect to the focus 20 can be determined by the evaluation unit 32 by means of the locating unit 34.

In FIG. 3A, the positioning section 46 is arranged between the emitter 14 and the detector 22, wherein the radiation 16 propagates through the positioning section 46. Within the positioning section 46, the measurement chamber 24 is aligned perpendicularly to the propagation direction of the radiation 16, so that the flow direction 26 of the particles 12 is aligned perpendicularly to the positioning axis 40. The locating unit 34 can be arranged within the positioning section 46.

FIG. 3B shows three different exemplary positions 481, 482, 483 of the measurement chamber 24 in the positioning section 46.

The extension of the measurement chamber 24 along the positioning axis 40 is less than the extension of the positioning section 46 along the positioning axis 40. It is thus possible to displace the measurement chamber 24 along the positioning axis 40 within the positioning section 46, since a free space is between the lateral boundaries of the positioning section 46 and the wall of the measurement chamber 24, which enables a displacement of the measurement chamber 24.

For example, the positioning section 46 can include different discrete positioning spaces 48. The positions of the positioning spaces 48 along the positioning axis 40 are known and correspondingly radiation cross-sections A_x are assigned to the positioning spaces 48. A measurement chamber 24 can be arranged in a positioning space 48. In this case, the measurement chamber 24 can be fastened at a positioning space 48, for example, by latching or screwing tight. Since the position with respect to the reference point 36 of each positioning space 47 is known, the system made up of positioning space 48 and positioning section 46 represents the locating unit 34. The positions of the positioning spaces 48 are preferably stored in a memory of the evaluation unit 32 or another controller.

The first position 481 is distinguished in that the positioning space 48 is arranged adjacent to the focus 20, so that the measurement chamber 24 is positioned closer to the emitter 14. The radiation cross-section A_x is larger there than in the focus 20.

The second position 482 is distinguished in that the positioning space 48 is arranged on the focus 20, so that the highest light intensity is coupled into the measurement chamber 24. The smallest radiation cross-section A_f along the positioning axis 40 is to be found there.

The third position 483 is distinguished in that the positioning space 48 is arranged opposite to the first position 481 on an opposite side of the focus 20 adjacent to the focus 20, so that the measurement chamber 24 is positioned closer to the detector 22. The radiation cross-section A_x is also larger there than in the focus 20.

Figure 4:
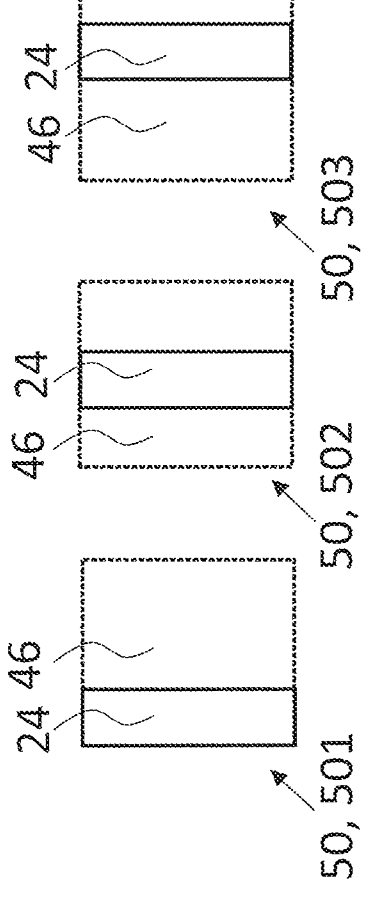
FIG. 4 shows various chamber carriers having differently positioned measurement chambers according to some embodiments.

FIG. 4 shows a further alternative of the locating unit 34. In this case, the positioning section 46 does not include a plurality of different positioning spaces 48. The positioning section 46 preferably only includes one positioning space 48. A positioning section 48 is provided, in which a chamber carrier 50 is inserted which is provided for different measurement chambers 24.

The measurement chamber 24 is arranged on the chamber carrier 50. The chamber carrier 50 is arranged on the positioning space 48 of the positioning section 46.

The measurement chamber 24 is arranged in a defined position on the chamber carrier. To change the position with respect to the reference point 36 of the measurement chamber 24, multiple chamber carriers 50 are provided, which each differ with respect to the position of the measurement chamber 24 on the respective chamber carrier 50. All of these chamber carriers 50 are compatible with the positioning space 48.

Three chamber carriers 501, 502, 503 are shown by way of example in FIG. 4, in which the position of the measurement chamber 24 on the chamber carrier 501, 502, 503 differs.

The first chamber carrier 501 is distinguished in that the position of the measurement chamber 24 is arranged adjacent to the focus 20, thus at the left lateral edge of the chamber carrier 501, so that the measurement chamber is positioned closer to the emitter 14. The radiation cross-section A_x is larger there than in the focus 20.

The second chamber carrier 502 is distinguished in that the position of the measurement chamber 24 is arranged at the location of the focus 20, so that the highest light intensity is coupled into the measurement chamber 24. The smallest radiation cross-section A_f along the positioning axis 40 is to be found there.

The third chamber carrier 503 is distinguished in that the position of the measurement chamber 24 is arranged opposite to the position of the first chamber carrier 501 on an opposite side of the focus 20 adjacent to the focus 20, so that the measurement chamber 24 is positioned closer to the detector 22. The radiation cross-section A_x is also larger there than in the focus 20.

The measurement chambers 24 can be arranged at any arbitrary position on the chamber carrier 50.

Figure 5:
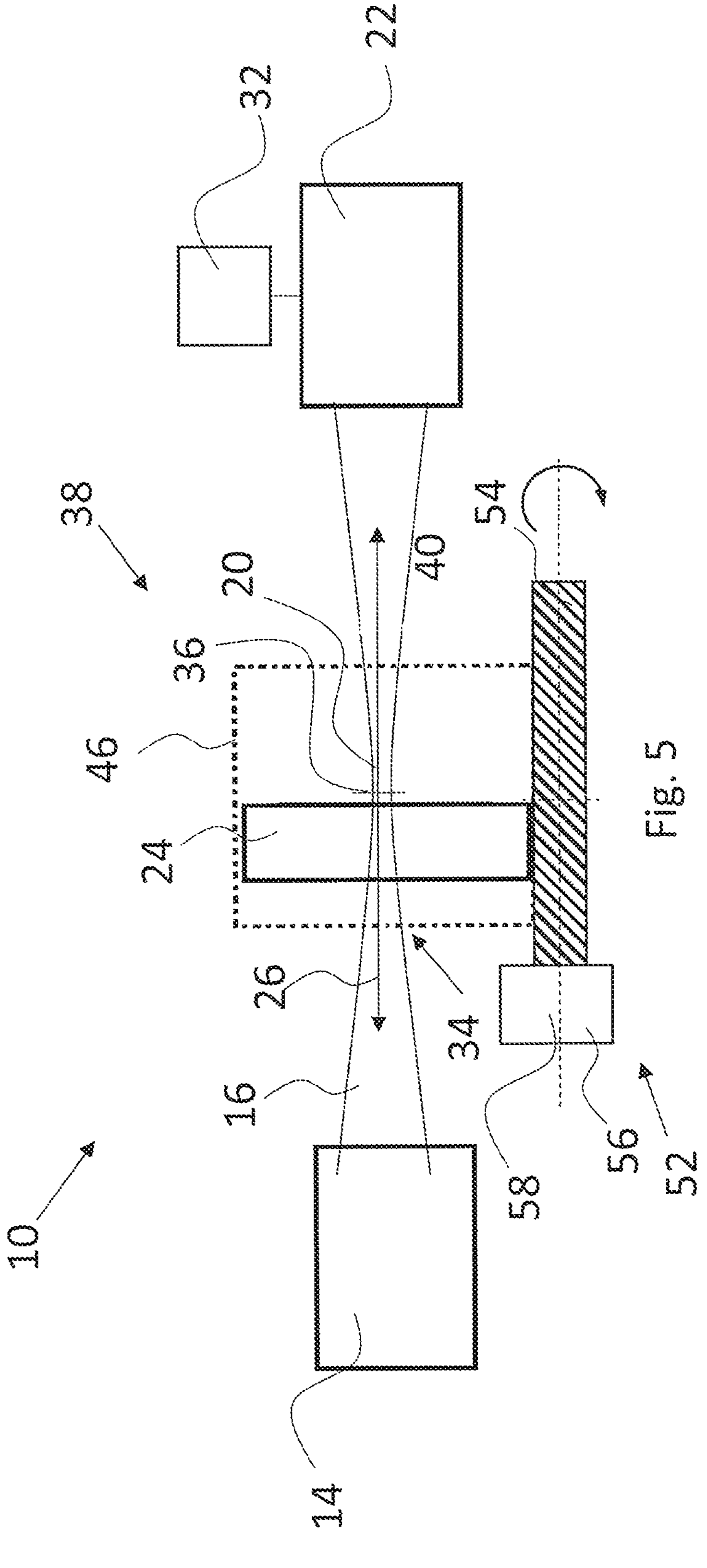
FIG. 5 shows an embodiment of the sensor arrangement having a set screw.

FIG. 5 shows a sensor arrangement 10 having an adjustment unit 52. The adjustment unit 52 comprises a set screw 54 and an electric motor 56.

The measurement chamber 24 can be continuously positioned in the positioning section 46 by the adjustment unit 52. For this purpose, the set screw 54 of the adjustment unit 52 is rotated. Due to the pitch of the set screw 54, upon a coaxial rotation around the screw axis, a movement of the measurement chamber along the screw axis and thus along the positioning axis 40 takes place, which is aligned parallel or collinear to the screw axis. The rotation is indicated in FIG. 5 by a curved arrow and the screw axis is indicated by a dashed line.

The electric motor 56 includes an encoder unit 58. The position of the measurement chamber 24, which results, for example, from the revolutions of the set screw 54, is converted by the encoder unit 58 into a digital signal. The encoder unit 58 is connected to the evaluation unit 32. Alternatively, the set screw 54 can be driven by hand.

A precise setting of a position within the coordinate system 38 can be carried out by the set screw 54. For example, a set screw 54 can be formed having a fine thread for this purpose.

In a further embodiment, a combination made up of positioning spaces 48 and an adjustment unit 52 can also be provided, so that a continuous adjustment of the measurement chamber 24 can take place starting from a positioning space 48. For example, the positioning spaces 48 can be arranged along a link-type carrier, which can be adjusted by the set screw 54 along the positioning axis 40.

In principle, the measurement chamber 24 of all exemplary embodiments can be equipped with an identifier. An RFID system and/or a laser-scannable code can be used as the identifier. In this case, for example, the position of the measurement chamber 24 in the coordinate system 38 can be read out and/or the type of the measurement chamber 24 can be identified, wherein the material and the shape of the measurement chamber 24 can determine the type. This also includes the identification of the position of the measurement chamber on the chamber carrier or the type of the chamber carrier 50. Furthermore, a measurement chamber 24 on a specific positioning space 48 is also determinable by the identifier, for example, by a poka-yoke system.

Figure 6:
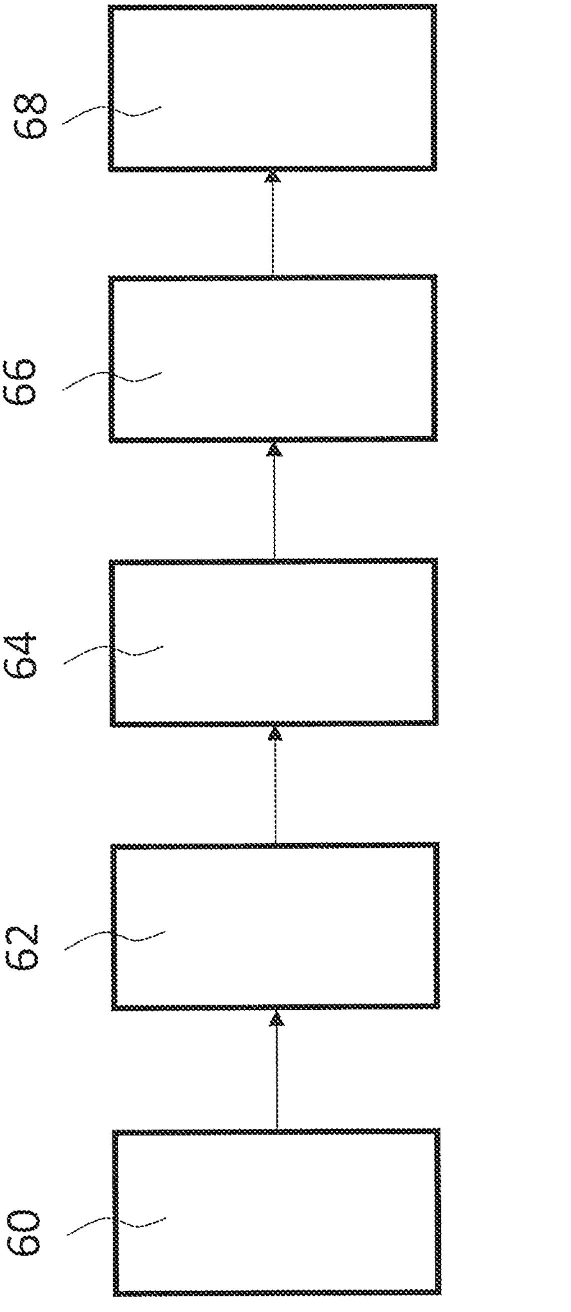
FIG. 6 shows a flowchart illustrating a method according to some embodiments.

FIG. 6 shows a flow chart of the method for determining features of particles 12 using the sensor arrangement 10.

In this case, emission 60 of the electromagnetic radiation 16 takes place from an emitter 14. Furthermore, according to the method, a partial reception 62 of the electromagnetic radiation 16 takes place using a detector 22, wherein a part of the radiation 16 does not arrive at the detector 22 due to the shading by the particles 12. In order that the particles 12 can be irradiated, a conduction 64 of the particles 12 takes place through the measurement chamber 24 that can be irradiated by the emitter 14. The detector 22 generates detector signals due to the detected radiation 16, which are accompanied by properties from the intensity of the radiation 16 received by the detector. These detector signals are digitized and evaluated by the evaluation unit. The particle size is determined by the evaluation 66.

In order that a correct evaluation can take place, the position of the measurement chamber 24 is located by the locating unit 34 with respect to the reference point 36, so that the position of an irradiated particle 12 is determined within the emitted radiation 16.

Since each position along the positioning axis 40 is assigned a radiation cross-section, a cross-sectional ratio $A_x/A_p$ between a radiation cross-section $A_x$ and a particle cross-section $A_p$ aligned perpendicularly with respect to the propagation direction of the radiation 16 can be determined from the detector signals. In order that a particle cross-section $A_p$ can be calculated from the cross-sectional ratio $A_x/A_p$, a calibration curve stored before the measurement in a memory of the evaluation unit 32 is processed using the digitized detector signals.

The selection of the calibration curve and the processing 68 of the calibration curve using the detector signals is carried out with respect to the position of the particle 12 in the coordinate system 38. A calibration curve is assigned to each location along the positioning axis 40, so that a calibration curve can be assigned to each position of a particle 12. The calibration curves can also additionally be selected depending on the type of the measurement chamber 24, wherein the identifier of the measurement chamber 24 can be evaluated so that the type of the measurement chamber 24 is determined.

The radiation cross-section $A_x$ is, according to the exemplary embodiments, the cross-section of the laser beam. To obtain the cross-sectional ratio, the position of the particle along the positioning axis is determined, since the radiation cross-section is known at each position and is stored in a table in a memory of the evaluation unit. The radiation cross-section $A_f$ of the focus 20 of the laser beam is smaller than the other radiation cross-sections $A_x$. In this case, the cross-sectional ratio is $A_f/A_p<A_x/A_p$, because the radiation cross-section $A_x$ is larger than the radiation cross-section $A_f$ in the focus.

A diameter ratio between a maximum and a minimum particle diameter remains constant at approximately 20 independently of the position of the measurement chamber 24 along the positioning axis 40. In this case, the correct calibration curve for each position along the positioning axis 40 ensures a measurement range between maximum and a minimum particle diameter which has a sufficient measurement quality.

The sensor arrangement 10 can be part of a particle sensor for analyzing particles.

In an alternative or additional embodiment, the measurement chamber 24 can be arranged between the emitter 14 and the detector 22, so that the measurement chamber 24 is preferably arranged on an imaginary straight line between the emitter 14 and the detector 22. The imaginary straight line can be aligned collinearly with the propagation direction of the laser radiation. In a further embodiment, it can be provided that a reflection means is arranged in the beam path between the emitter 14 and the detector 22, so that the measurement chamber 24 is not arranged on the shortest connection (imaginary straight line) between the emitter 14 and the detector 22.

In one embodiment of the invention, instead of shading in the course of an extinction method, scattered light of the radiation 16 can also be detected by the detector 22 on the basis of a scattered light detection method. The scattered light is generated by scattering of the radiation 16, which is preferably a laser light, at the particles 12. All other features of the above-described exemplary embodiments can be combined with the principle of the scattering method. For example, the adjustment unit 52, the chamber carrier 50, the locating unit 34, and/or the positioning spaces 48 are combinable with a sensor arrangement 10, which makes use of the scattering method.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

10 sensor arrangement
12 particle
14 emitter
16 radiation
20 focus
22 detector
24 measurement chamber
26 flow direction
28 inlet
30 outlet
32 evaluation unit
34 locating unit
36 reference point
38 coordinate system
40 positioning axis
42 first position
44 second position
46 positioning section
48 positioning space
481 first position
482 second position
483 third position
50 chamber carrier
501 first chamber carrier
502 second chamber carrier
503 third chamber carrier
52 adjustment unit
54 set screw
56 electric motor
58 encoder unit
60 emission
62 reception
64 conduction through
66 evaluation
68 processing

The invention claimed is:

1. A sensor arrangement for detecting features of particles, the sensor arrangement comprising:

an emitter for emitting electromagnetic radiation;

a detector for receiving the radiation emitted from the emitter and for providing detector signals as a function of the received radiation;

a measurement chamber configured to be irradiated by the radiation emitted by the emitter, and to receive particles flowing therethrough;

an evaluation unit for evaluating the detector signals; and a locating unit for locating the measurement chamber with respect to a reference point of a coordinate system, so that a respective position of a respective particle within the radiation is determinable, wherein the locating unit includes a positioning section, in which the measurement chamber is displaceable along a positioning axis in the coordinate system, and wherein the positioning section includes different discrete positioning spaces, in which the measurement chambers are arrangeable within the positioning section.

2. The sensor arrangement according to claim 1, wherein the measurement chamber is an elongated hollow body transparent to the radiation, which includes an inlet and an outlet for the particles, so that at least one particle can flow through the measurement chamber.

3. The sensor arrangement according to claim 1, wherein the radiation is a laser radiation and the reference point is arranged at a location of a focus of the laser radiation.

4. The sensor arrangement according to claim 1, wherein the measurement chamber has a lesser extension along the positioning axis than the positioning section.

5. The sensor arrangement according to claim 1, wherein the measurement chamber includes an identifier, which is readable via an RFID system, and/or a laser-scannable code.

6. The sensor arrangement according to claim 1, wherein the particles flow in a particle flow through the measurement chamber, wherein a flow direction is transverse to the positioning axis.

7. A method for determining features of particles using a sensor arrangement according to claim 1 for detecting the features of the particles, the method comprising:

emitting electromagnetic radiation from an emitter;

at least partially receiving the electromagnetic radiation using a detector;

conducting particles through a measurement chamber configured to be irradiated by the electromagnetic radiation emitted from the emitter;

providing detector signals from an intensity of the radiation received by the detector;

locating the measurement chamber with respect to a reference point of a coordinate system of the sensor arrangement, so that a respective position of a respective particle within the emitted radiation is determined;

determining at least one feature of the particles which flow through the measurement chamber, wherein a cross-sectional ratio between a radiation cross-section and a particle cross-section aligned with respect to a propagation direction of the radiation is determined with respect to a positioning axis in the coordinate system, wherein the cross-sectional ratio is determined with respect to a calibration curve related to the positioning axis.

8. The method according to claim 7, wherein calibration curves for each position along the positioning axis are stored in a memory of the sensor arrangement, and to determine the cross-sectional ratio, at least one calibration curve is read out with respect to a respective position assumed by the measurement chamber.

9. The method according to claim 7, wherein a diameter ratio between a maximum particle diameter and a minimum particle diameter of the measurable particle cross-sections remains constant independently of a position of the measurement chamber along the positioning axis.

10. The method according to claim 9, wherein the diameter ratio is approximately 20.

11. A sensor arrangement for detecting features of particles, the sensor arrangement comprising:

an emitter for emitting electromagnetic radiation;

a detector for receiving the radiation emitted from the emitter and for providing detector signals as a function of the received radiation;

a measurement chamber configured to be irradiated by the radiation emitted by the emitter, and to receive particles flowing therethrough;

an evaluation unit for evaluating the detector signals;

a locating unit for locating the measurement chamber with respect to a reference point of a coordinate system, so that a respective position of a respective particle within the radiation is determinable, wherein the locating unit includes a positioning section, in which the measurement chamber is displaceable along a positioning axis in the coordinate system; and an adjustment unit, so that the measurement chamber is continuously positionable along the positioning section, wherein the adjustment unit comprises a set screw of an encoder unit, wherein the set screw displaces the measurement chamber along the positioning axis and converts a position of the measurement chamber using the encoder unit into a digital signal.

* * * * *